United States Patent [19]
Kaesemeyer

[11] 3,728,917
[45] Apr. 24, 1973

[54] MULTI-PLUNGE TURNING APPARATUS

[75] Inventor: Carl W. Kaesemeyer, Cincinnati, Ohio

[73] Assignee: Cincinnati Milacron Inc., Cincinnati, Ohio

[22] Filed: Dec. 15, 1971

[21] Appl. No.: 208,248

[52] U.S. Cl. ..............................82/25, 82/11, 29/97
[51] Int. Cl. ..............................................B23b 21/00
[58] Field of Search ..................82/25, 11; 29/97

[56] References Cited

UNITED STATES PATENTS

| | | | |
|---|---|---|---|
| 2,499,509 | 3/1950 | Kendall | 82/25 |
| 1,883,093 | 10/1932 | Taylor | 82/25 |
| 1,636,028 | 7/1927 | Whipp | 82/25 |
| 552,717 | 1/1896 | McClellan | 82/25 X |

*Primary Examiner*—Leonidas Vlachos
*Attorney*—Howard T. Keiser et al.

[57] ABSTRACT

An apparatus for turning a rotating workpiece includes an improved turning apparatus. The improvement comprises a plurality of cutting tools radially spaced about the axis of rotation and secured to a support designed to align the tools in a manner that minimizes the forces present at the axis of rotation. There is further included a means for synchronizing the advancement of the cutting tools into the workpiece.

2 Claims, 6 Drawing Figures

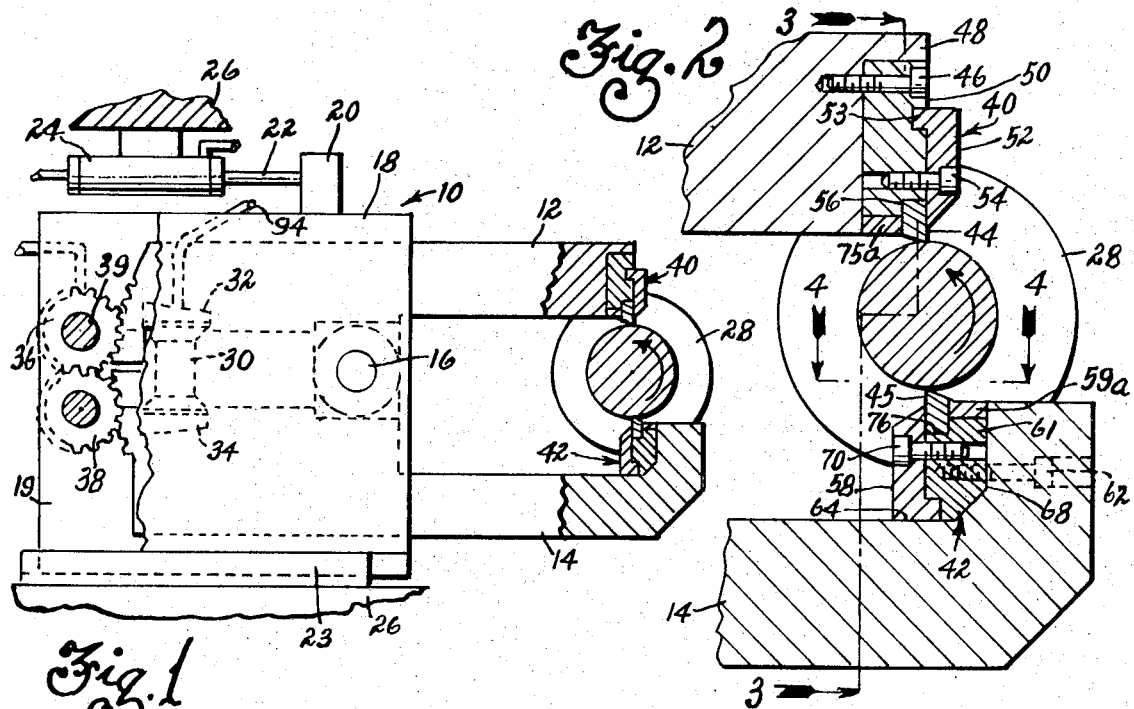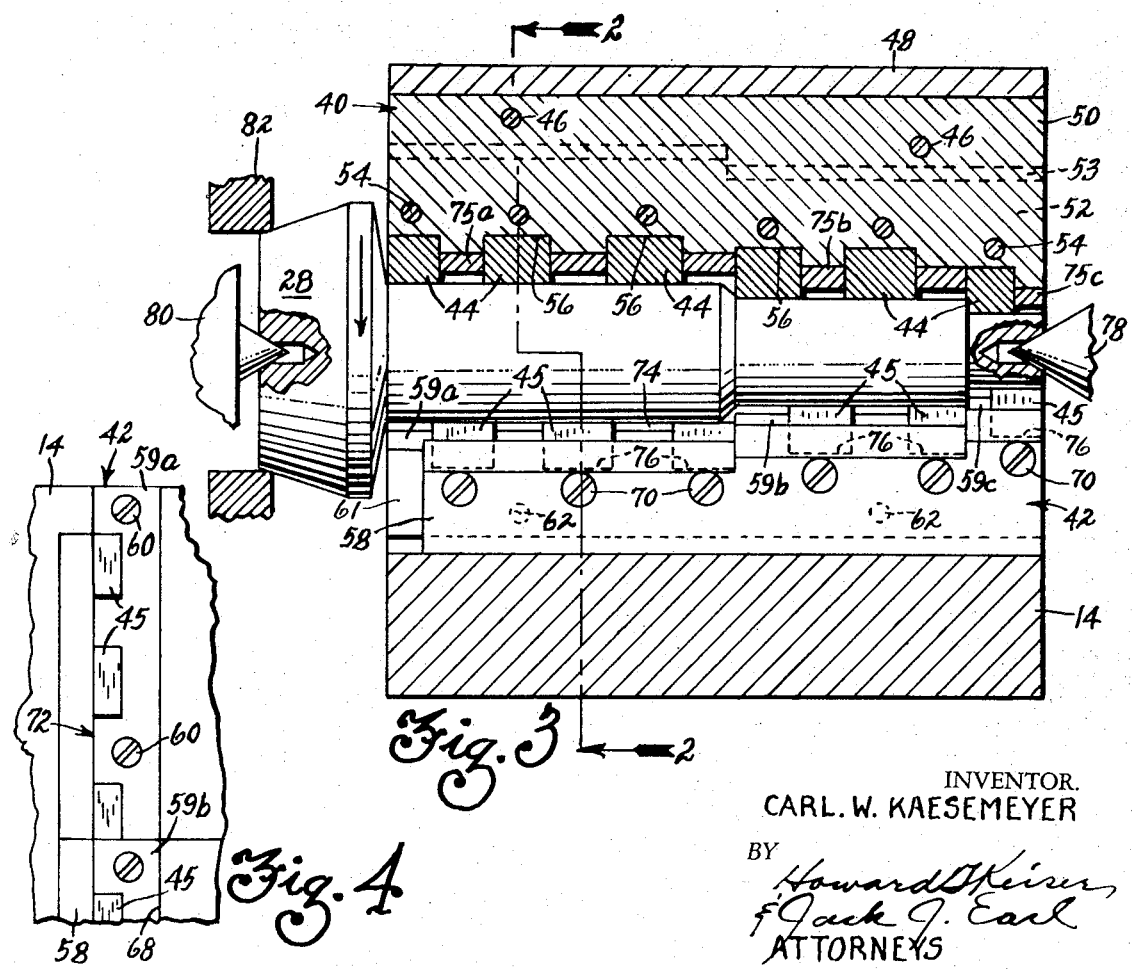

MULTI-PLUNGE TURNING APPARATUS

BACKGROUND OF THE INVENTION

This invention relates to turning and more particularly to plunge turning processes.

Plunge turning processes have certain basic differences from conventional turning techniques. The cutting tool is fed into the workpiece in a radial direction rather than in an axial direction; and generally a number of tools are used simultaneously, rather than a single tool. Further, in conventional turning applications and in many plunge turning processes the workpiece is machined from one side only. The present invention relates to that class of plunge turning wherein cutting is performed simultaneously on a number of sides of the workpiece. This class of turning is generally referred to as multi-plunge turning.

The multi-plunge turning techniques herein disclosed are most effectively utilized for roughing cuts on workpieces to be finished by a grinding operation. The application of this process on a workpiece requiring a series of step diameters greatly increases production efficiency. Further, wheel wear on the finishing grinding machine is decreased considerably through utilization of a turning apparatus which conforms to the contours of the wheel and finished part.

The multi-plunge turning techniques herein described also have a favorable effect on the metal removal rate when compared to conventional turning operations. Experimental results have further shown that multi-plunge turning results in favorable gains over conventional turning with respect to machining costs, total production costs, machining time, and production time.

It is, therefore, an object of the present invention to provide a multi-plunge turning apparatus for effectively turning the family of parts having a plurality of stepped diameters in a single operation. Other objects and features of the invention will be apparent from the ensuing description.

SUMMARY OF THE INVENTION

The present invention discloses a multi-plunge turning apparatus that utilizes a plurality of cutting tools. A rotating workpiece located on centers is simultaneously penetrated by a number of tools radially spaced about the periphery of the workpiece, or the axis of rotation. Thus, the tools effect a plunge cut as the workpiece is reduced to its finished size.

A number of axially spaced cutting tools are held by one tool holder. A second set of axially spaced cutting tools are held by a second tool holder. These sets of tools are radially spaced about the periphery of a rotating workpiece in a manner that minimizes the forces acting upon the axis of rotation. Both sets of tools are simultaneously fed into the rotating workpiece to a predetermined depth.

Although the preferred embodiment discloses two sets of cutting tools diametrically opposed, any number of tool sets may be utilized where the forces at the axis of rotation are minimized. The tools are axially spaced so that each tool is machining a unique portion of the workpiece. However, a certain amount of overlap is provided as a safety factor in the event one tool breaks.

As further protection in the event of failure there is provided a second cutting edge which is inserted between the cutting tools in each of the tool holders. This cutting edge prevents damage to the tool holder in the event any of the tools in a particular tool holder fails for any reason.

THE DRAWINGS

FIG. 1 illustrates a portion of a machine tool utilizing the preferred embodiment of the present invention.

FIG. 2 is an enlargement of a portion of FIG. 1 showing in greater detail the preferred embodiment; the cutting plane of FIG. 2 is the line 2—2 of FIG. 3.

FIG. 3 is a section view taken along lines 3—3 of FIG. 2 and showing the cutting tools of the present invention.

FIG. 4 is a section view taken along lines 4—4 of FIG. 2.

DETAILED DESCRIPTION

Figure 5:
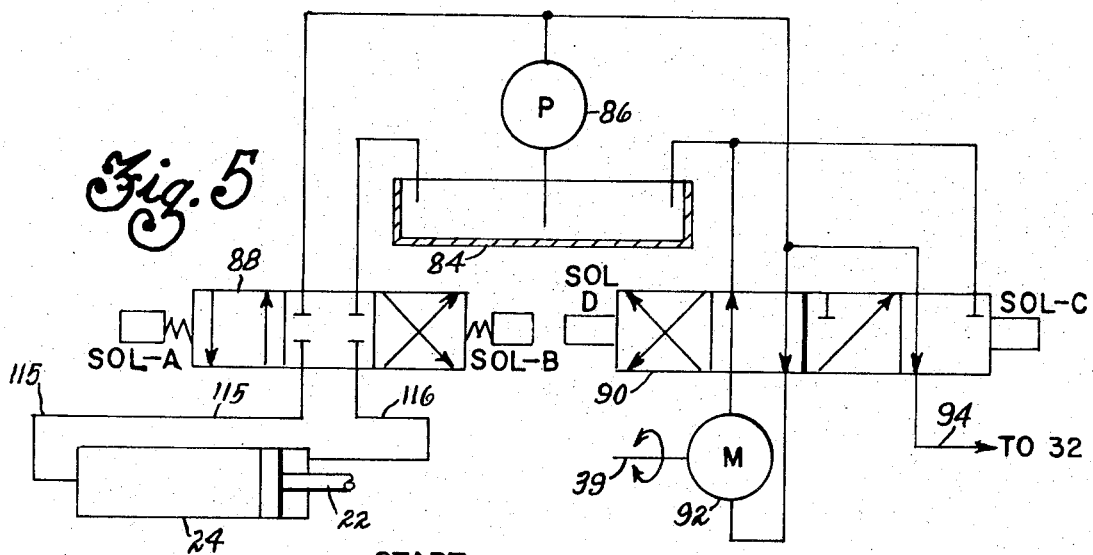
FIG. 5 is a schematic diagram of the electro-hydraulic circuitry for cycling the mechanism of the preferred embodiment.

Referring first to FIG. 1 there is shown the multi-plunge turning apparatus 10 of the present invention. The lever arms 12 and 14 are rotatably secured to shaft, or fulcrum point 16, between the support wall 18 and parallel support wall 19. The support walls 18 and 19 are rigidly secured to a support 20 which is the end of piston 22. The piston 22 extends from cylinder 24 which is rigidly secured to the base 26. In this manner as the piston moves in and out of cylinder 24 the plunge turning apparatus 10 slides on the slide 23 which is also secured to the base 26.

The workpiece 28 rotates on centers 78 and 80 (shown in FIG. 3). The centers generate an axis of rotation and are secured to the base 26 in a manner that permits separation of centers for insertion of the workpiece 28 but maintain the centers in a fixed position with respect to the cylinder 24. Therefore, as the piston 22 is moved in and out of cylinder 24, the apparatus 10 moves toward and away from a rotating workpiece 28 held between the centers 78 and 80.

The piston 30 and expansible chambers 32 and 34 with the gears 36 and 38 provide a tool driving means for the present invention. This driving means is more particularly described in the co-pending application of C.W. Kaesemeyer, assigned to the present assignee, entitled "Hydraulic Actuator with Arcuate Expansible Chambers", Ser. No. 208,133, filed Dec. 15, 1971. This driving means synchronizes the movement of the tools 40 and 42 secured to lever arms 12 and 14 respectively as they enter the rotating workpiece 28. In the present embodiment the tools simultaneously enter the workpiece 28.

The tools or tool holders 40 and 42 are more clearly illustrated in FIGS. 2 through 4. The tool holders 40 and 42 contain a plurality of cutting tools 44 and 45, respectively. The tool holder 40 is secured by mounting bolts 46 to the top lever arm 12. The shoulder 48 on lever arm 12 provides a bearing surface for bracket 50 of the holder 40 so that the forces against the cutting tools 44 are not absorbed entirely by the mounting bolts 46. Thus the mounting bolts 46 serve only to align and hold the holder 40 in place and are not relied upon for strength against shear. A mounting bracket 52 is secured to the bracket 50 by mounting bolts 54 and depends upon the tab 53 for position and leverage. Placed between the mounting bar 52 and the bracket 50 are the cutting tools 44. The cutting tools 44 are wedged between the brackets 52 and 50 and held in spaced seats 56 as best shown in FIG. 3.

Since the workpiece 28 rotates counter-clockwise as shown, the forces on the cutting tools 44 tend to push the tools into the seat 56 and against the rigid bracket 50. Therefore, it is not necessary to provide any further means to secure the cutting tools 44 in the brackets 50 and 52.

Diametrically opposite cutting tools 44 are cutting tools 45 of the bottom tool holder 42. These tools are held in a similar manner between mounting bracket 58 and bracket 61. The bracket 61 is secured to the lever arm 14 by mounting bolts 62 in a manner similar to the method of mounting bracket 50. The bearing surfaces 64 and 68 on lever 14 are provided to absorb the forces exerted on the cutting tool 42 thus minimizing the shear forces on mounting bolts 62. The mounting bracket 58 is secured to bracket 61 by mounting bolts 70 as shown in FIGS. 2 and 3 and in a manner similar to the means for mounting bracket 52. The tools 45 are wedged between mounting bracket 58 and 61 and held in spaced seats 76 in the same manner as described with respect to tools 44.

As best shown in FIG. 4, there is a secondary cutting edge provided by a series of plates 59a, 59b, and 59c (one plate for each stepped diameter) which are secured to the bracket 61 by a series of mounting screws 60. As seen in FIG. 2, the plates 59 bears against bearing surface 68 of the lever arm 14. Thus, the screws 60 provide the only necessary securing means to hold the plate in place during machining operations. The plates 59 is designed to fill the dead space between the spaced cutting tools 45 thus providing a cutting edge 72 along the entire face of the holder 42. As can be seen in FIG. 3 the tools 45 extend beyond the plates 59 leaving a gap 74 between the workpiece 28 and the plate 59. The gap 74 is exaggerated here for purpose of illustration. This gap is generally reduced to a few thousandths of an inch in the actual preferred embodiment of the invention.

The exposed cutting edge of plates 59 is diametrically opposite the cutting tools 44 and provides a secondary cutting surface in the event any of the tools 44 fail to perform thus reducing the possibility of damage to the workholder 42 in the event of malfunction. There is a similar series of plates 75a, b, and c secured to the bracket 50 and designed to fill the dead space between the tools 44 on the tool holder 40. These plates serve as a secondary cutting edge and are diametrically opposite the tools 45 in tool holder 42 to protect against failure of any of those teeth.

The workpiece 28 is rotated between two typical hydrostatic centers 78 and 80, as shown in FIG. 3. The work driver is by necessity one having the ability to generate a high torque to the workpiece. The typical driver 82 utilized in the present invention is described in the co-pending application of C.W. Kaesemeyer, entitled "Rotary Work Driver for Machine Tools", Ser. No. 145,293, filed on May 20, 1971 and assigned to the present assignee. It is designed to grasp the workpiece and drive it in the direction of the arrows as indicated in FIGS. 1 through 3.

The workpiece 28 is located between hydrostatic centers 78 and 80 and is rotated by the work driver 82. The piston 22 next pushes the turning apparatus 10 to a point where the cutting tools 40 and 42 are above the center axis of the rotating workpiece 28. Then the driving mechanism consisting of the piston 30 and the chambers 32 and 34 with gears 36 and 38 force the levers 12 and 14 simultaneously toward the center of the workpiece causing the holders 40 and 42 and tools 44 and 45 to penetrate the surface of the workpiece and reduce the workpiece to the finished size. In this manner excess surface material is removed from the workpiece 28 in a single plunge cut.

It is necessary that the cutting tools 44 and 45 be diametrically opposite each other when entering the workpiece. In this manner the adverse forces on the centers 78 and 80 are minimized by the cancelling out of forces generated by the cutting tools 44 and 45 as they enter the rotating workpiece 28. It can be seen that any number of cutting tools could be utilized as long as they are so positioned about the axis of rotation to minimize forces acting at the center of the workpiece.

As shown in FIG. 3, the cutting tools 44 are alternately spaced with the cutting tools 45 along the axis of the workpiece 28 so that each cutting tool is operating on a unique portion of the periphery of the workpiece. A certain amount of over lapping is provided to prevent high stress on the corners of each cutting tool. As demonstrated in FIG. 3, the preferred embodiment of the present invention is particularly advantageous where the workpiece has a series of stepped diameters. However, the invention could also be utilized in other applications.

Figure 6:
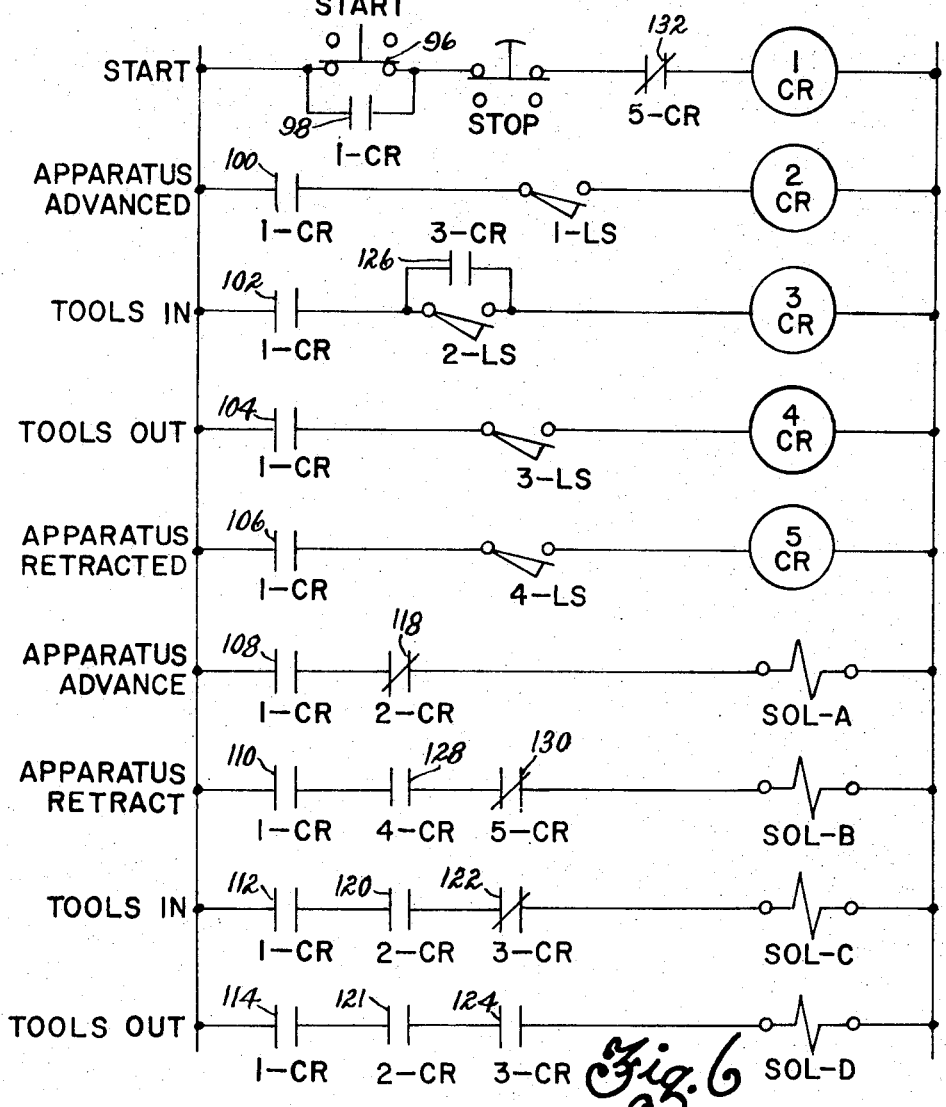
FIG. 6 is an electrical schematic illustrating a triggering network for the solenoids of the electro-hydraulic circuit of FIG. 5.

FIGS. 5 and 6 illustrate the electro-hydraulic circuit and electrical circuitry for cycling the working members of the turning apparatus 10. The electro-hydraulic diamgram of FIG. 5 as illustrated corresponds with the position of the turning apparatus 10 in FIGS. 1 through 3. The cutting tools 44 and 45 have penetrated the workpiece to the finished size and the apparatus 10 is ready to be retracted from the workpiece 28 so that the workpiece 28 may be removed and a new workpiece inserted in the machine. There are limit switches provided on the apparatus 10 to initiate the solenoids controlling the direction of flow of the hydraulic fluid as shown in FIG. 5. The limit switches are not illustrated in FIGS. 1 through 3 for sake of simplification.

Referring now to FIG. 6, when the start button 96 is depressed, the coil for 1–CR is switched on. Thus the normally open contacts 98, 100, 102, 104, 106, 108, 110, 112 and 114 are closed, shorting the circuits thereacross. The piston 22 is always in the retracted position at start (to the left, as illustrated). When the 1–CR contacts 108 are closed at the depression of the start button 96 the solenoid A is picked up. This switches the solenoid controlled spring return servo-valve 88 to the left position.

There is a reservoir 84 provided with hydraulic fluid contained therein. The pump 86 provides fluid under pressure to the servo-valve 88 and the servo-valve 90. When the valve 88 is in the left position, pressure is supplied to the cylinder 24 through supply line 115. Thus forcing the piston 22 to the right. This brings the apparatus 10 to the working position. When the piston 22 reaches this advance position, the first limit switch, 1-LS is closed switching on 2-CR. Thus, the normally closed contacts 118 of 2-CR are opened and solenoid A is dropped out of the circuit allowing the springs on servo-valve 88 to return the valve to the center position. Thus, the pressure on both sides of the piston 22 is equalized and the apparatus is maintained in the advanced position. Also, when 2-CR is switched on, the normally opened contacts 120 close and solenoid C is picked up. This moves the valve 90 to the right, as shown in FIG. 5, and the chamber 32 is opened to pressure via line 94. The normally opened contacts 121 are also closed at this time.

The motor 92 rotates the shaft 39 counter-clockwise as shown in FIG. 1 allowing the expansible chambers 32 and 34 to expand thus feeding the tools 44 and 45 into the rotating workpiece 28. When the tools 44 and 45 have penetrated to a predetermined depth, a limit switch 2-LS is closed switching on 3-CR. This opens the normally closed contacts 122 dropping solenoid C out of the circuit. At this time the normally opened contacts 124 are closed and, solenoid D is picked up switching the valve 90 to the left position and reversing the direction of rotation of the shaft 39. This opens line 94 to exhaust thus retracting the cutting tools 40 and 42 from the workpiece 28. The normally closed contacts 126 are also closed so that 3-CR remains switched on after the tools have backed away from 2-LS.

When the tools 44 and 45 have retracted from the workpiece 28, 3-LS is closed switching on the 4-CR. This closes the normally opened contacts 128 and picks up solenoid B. This moves the valve 88 to the right position opening line 116 to pressure and line 115 to exhaust thus moving the piston 22 from the advanced position to the retracted position (to the left as illustrated). In this manner, the apparatus 10 is retracted from the workpiece 28.

When the piston 22 has reached the retracted position 4-LS is closed switching on 5-CR. This opens the normally closed contacts 130 of 5-CR, dropping solenoid B out of the circuit. Thus, the valve 88 is returned by the spring to the center position equalizing the pressure on both sides of the piston 22.

The normally closed contacts 132 are also opened thus switching off 1-CR and opening all the contacts 98 through 114.

Depression of the button 96 is now necessary to recycle the machine. It is, therefore, possible to remove the workpiece 28 from between the centers 78 and 80 and replace it with a new unfinished workpiece before recycling the apparatus 10.

While the foregoing has been presented as descriptive embodiment of the present invention, it should be understood that is is merely illustrative and is not intended to limit the scope of the appended claims nor the spirit of the invention.

What is claimed is:

1. An apparatus for turning a workpiece to a predetermined size comprising a work holder supported by a base for locating and securing the workpiece, driving means for rotating the workpiece about an axis of rotation and an improved turning apparatus, wherein the improvement comprises:
    a. a plurality of cutting tools, each of said cutting tools having a singular cutting edge, said tools radially spaced about the axis of rotation;
    b. a pair of lever arms pivotally secured about a common fulcrum point;
    c. a first tool holder secured to the end of one of said lever arms for securing a number of said cutting tools in a manner that the cutting edge of each of said cutting tools is parallel to the axis of rotation;
    d. a second tool holder secured to one end of said other lever arm for securing a number of said cutting tools in a manner that the cutting edge of each of said tools is parallel to the axis of rotation and substantially diametrically opposite the cutting edge of each of said first cutting tools;
    e. means associated with said first tool holder for axially spacing each of the cutting tools therein secured and for providing a dead space therebetween; and
    f. means associated with said second tool holder for axially spacing each of the cutting tools therein secured and for providing a dead space therebetween in a manner that said cutting tools of said second tool holder are opposite the dead spaces of said first tool holder; and
    g. a secondary cutting edge associated with each of said tool holders and designed to fill the dead space therein.

2. The apparatus of claim 1 wherein there is further comprised means associated with said pair of lever arms for causing relative movement between the base and said pair of lever arms.

* * * * *